(12) United States Patent
Van Den Berg et al.

(10) Patent No.: US 8,987,175 B2
(45) Date of Patent: Mar. 24, 2015

(54) PROCESS FOR PRODUCING A PURIFIED SYNTHESIS GAS STREAM

(75) Inventors: Robert Van Den Berg, Amsterdam (NL); Matthieu Simon Henri Fleys, Amsterdam (NL); Mark Jan Prins, Amsterdam (NL); Cornelis Jacobus Smit, Amsterdam (NL); Alex Frederik Woldhuis, Amsterdam (NL)

(73) Assignee: Shell Oil Company, Houston, TX (US)

( * ) Notice: Subject to any disclaimer, the term of this patent is extended or adjusted under 35 U.S.C. 154(b) by 682 days.

(21) Appl. No.: 13/260,759

(22) PCT Filed: Mar. 30, 2010

(86) PCT No.: PCT/EP2010/054185
§ 371 (c)(1),
(2), (4) Date: Nov. 21, 2011

(87) PCT Pub. No.: WO2010/112500
PCT Pub. Date: Oct. 7, 2010

(65) Prior Publication Data
US 2012/0058921 A1     Mar. 8, 2012

(30) Foreign Application Priority Data

Mar. 30, 2009   (EP) ..................................... 09156584

(51) Int. Cl.
*C09K 8/60*       (2006.01)
*C01B 3/38*       (2006.01)
(Continued)

(52) U.S. Cl.
CPC ................ *C01B 3/58* (2013.01); *B01D 53/002* (2013.01); *B01D 53/1462* (2013.01);
(Continued)

(58) Field of Classification Search
CPC .......... C09K 8/703; C09K 8/592; E21B 43/24
USPC ........................... 507/202; 252/373; 423/352
See application file for complete search history.

(56) References Cited

U.S. PATENT DOCUMENTS 6,998,098 B2 * 2/2006 Allison ......................... 423/210
2005/0135983 A1 6/2005 Geosits et al. ............. 423/242.1
(Continued)

FOREIGN PATENT DOCUMENTS

EP          0066310       3/1985    ............. B01D 53/34
WO     WO 2008019497     2/2008     ............... B67D 1/12
WO     WO 2008124767    10/2008

*Primary Examiner* — Susannah Chung
*Assistant Examiner* — Atnaf Admasu

(57) ABSTRACT

A process for producing a purified synthesis gas stream from a feed synthesis gas stream comprising besides the main constituents carbon monoxide and hydrogen also hydrogen sulphide, HCN and/or COS, the process comprising the steps of: (a) removing HCN and/or COS by contacting the feed synthesis gas stream with a catalyst in a HCN/COS reactor in the presence of steam/water, to obtain a synthesis gas stream depleted in HCN and/or in COS; (b) converting hydrogen sulphide in the synthesis gas stream depleted in HCN and/or in COS to elemental sulphur, by contacting the synthesis gas stream with an aqueous reactant solution containing solubilized Fe(III) chelate of an organic acid, at a temperature below the melting point of sulphur, and at a sufficient solution to gas ratio and conditions effective to convert $H_2S$ to sulphur and inhibit sulphur deposition, to obtain a synthesis gas stream depleted in hydrogen sulphide; (c) removing carbon dioxide from the synthesis gas stream depleted in hydrogen sulphide, to obtain the purified synthesis gas stream and a gas stream enriched in $CO_2$.

10 Claims, 1 Drawing Sheet

(51) Int. Cl.

| | | |
|---|---|---|
| *C01C 1/00* | (2006.01) | |
| *C01B 3/58* | (2006.01) | |
| *B01D 53/00* | (2006.01) | |
| *B01D 53/14* | (2006.01) | |
| *B01D 53/22* | (2006.01) | |
| *B01D 53/75* | (2006.01) | |
| *B01D 53/86* | (2006.01) | |
| *B01D 71/02* | (2006.01) | |
| *B01D 71/52* | (2006.01) | |
| *B01D 71/56* | (2006.01) | |
| *B01D 71/64* | (2006.01) | |
| *B01D 71/80* | (2006.01) | |
| *C01B 3/16* | (2006.01) | |
| *C01B 3/50* | (2006.01) | |
| *C01B 3/52* | (2006.01) | |

(52) U.S. Cl.
CPC ........... *B01D 53/1493* (2013.01); *B01D 53/22* (2013.01); *B01D 53/228* (2013.01); *B01D 53/75* (2013.01); *B01D 53/8668* (2013.01); *B01D 71/028* (2013.01); *B01D 71/52* (2013.01); *B01D 71/56* (2013.01); *B01D 71/64* (2013.01); *B01D 71/80* (2013.01); *C01B 3/16* (2013.01); *C01B 3/501* (2013.01); *C01B 3/506* (2013.01); *C01B 3/52* (2013.01); *B01D 2251/206* (2013.01); *B01D 2251/80* (2013.01); *B01D 2256/16* (2013.01); *B01D 2256/20* (2013.01); *B01D 2257/304* (2013.01); *B01D 2257/308* (2013.01); *B01D 2257/408* (2013.01); *B01D 2257/504* (2013.01); *C01B 2203/0415* (2013.01); *C01B 2203/0435* (2013.01); *C01B 2203/0475* (2013.01); *C01B 2203/0485* (2013.01); *Y02C 10/06* (2013.01); *Y02C 10/10* (2013.01)
USPC ........................... 507/202; 252/373; 423/352

(56) References Cited

U.S. PATENT DOCUMENTS

| | | | |
|---|---|---|---|
| 2007/0072949 | A1 | 3/2007 | Ruud et al. ..................... 518/702 |
| 2010/0126180 | A1* | 5/2010 | Forsyth et al. .................. 60/780 |

* cited by examiner

PROCESS FOR PRODUCING A PURIFIED SYNTHESIS GAS STREAM

PRIORITY CLAIM

The present application claims priority from PCT/EP2010/054185, filed 30 Mar. 2010, which claims priority from European Application 09156584.6, filed 30 Mar. 2009.

The present invention relates to a process for producing a purified synthesis gas stream from a feed synthesis gas stream comprising contaminants.

Synthesis gas streams are gaseous streams mainly comprising carbon monoxide and hydrogen. Synthesis gas streams are generally produced via partial oxidation or steam reforming of hydrocarbons including natural gas, coal bed methane, distillate oils and residual oil, and by gasification of solid fossil fuels such as biomass or coal or coke.

There are many solid or very heavy (viscous) fossil fuels which may be used as feedstock for generating synthesis gas, including biomass, solid fuels such as anthracite, brown coal, bitumous coal, sub-bitumous coal, lignite, petroleum coke, peat and the like, and heavy residues, e.g. hydrocarbons extracted from tar sands, residues from refineries such as residual oil fractions boiling above 360° C., directly derived from crude oil, or from oil conversion processes such as thermal cracking, catalytic cracking, hydrocracking etc. All such types of fuels have different proportions of carbon and hydrogen, as well as different substances regarded as contaminants.

Depending on the feedstock used to generate synthesis gas, the synthesis gas will contain contaminants such as carbon dioxide, hydrogen sulphide, carbonyl sulphide and carbonyl disulphide (COS) while also nitrogen, nitrogen-containing components (e.g. HCN and $NH_3$), metals, metal carbonyls (especially nickel carbonyl and iron carbonyl), and in some cases mercaptans.

Purified synthesis gas can be used in catalytical chemical conversions or to generate power. A substantial portion of the world's energy supply is provided by combustion of fuels, especially natural gas or synthesis gas, in a power plant. Synthesis gas is combusted with air in one or more gas turbines and the resulting gas is used to produce steam. The steam is then used to generate power.

An especially suitable system for using synthesis gas in power generation is the Integrated Gasification Combined Cycle (IGCC) system. IGCC systems were devised as a way to use coal as the source of fuel in a gas turbine plant. IGCC is a combination of two systems. The first system is coal gasification, which uses coal to create synthesis gas. The syngas is then purified to remove contaminants. The purified synthesis gas may be used in the combustion turbine to produce electricity.

The second system in IGCC is a combined-cycle, or power cycle, which is an efficient method of producing electricity commercially. A combined cycle includes a combustion turbine/generator, a heat recovery steam generator (HRSG), and a steam turbine/generator. The exhaust heat from the combustion turbine may be recovered in the HRSG to produce steam. This steam then passes through a steam turbine to power another generator, which produces more electricity. A combined cycle is generally more efficient than conventional power generating systems because it re-uses waste heat to produce more electricity. IGCC systems are clean and generally more efficient than conventional coal plants.

As set out hereinabove, when synthesis gas is used for power production, removal of contaminants is often required to avoid deposition of contaminants onto the gas turbine parts.

When synthesis gas is used in catalytical chemical conversions, removal of contaminants to low levels is required to prevent catalyst poisoning.

Processes for producing a purified synthesis gas stream generally involve the use of expensive line-ups. For example, cold methanol may be used to remove hydrogen sulphide and carbon dioxide by physical absorption. The concentrations of these contaminants in the purified synthesis gas will still be in the ppmv range. For applications where the synthesis gas is to be catalytically converted, contaminant concentrations in the ppmv range are still too high. Purifying the synthesis gas streams to a higher degree using a methanol-based process would be uneconomical due to the disproportionately large amounts of energy required to regenerate the methanol. In addition, the absorbed $H_2S$ needs to be removed, usually by contacting the methanol comprising $H_2S$ with a stripping gas at elevated temperatures, resulting in a stripping gas comprising $H_2S$. $H_2S$ in this stripping gas is then converted to elemental sulphur, requiring a considerable capital and operational expenditure.

In US 2007/0072949 syngas is treated to remove hydrogen sulphide in a separation unit, via the use of a solvent. The hydrogen sulphide is thus first separated from the synthesis gas before it is being converted to elemental sulphur, via a Claus or SCOT process.

In US 2005/0135983 a direct sulphur recovery system is disclosed, wherein the gas stream is directly subjected to a Claus process at high pressure and moderate temperatures. The disadvantage of the process as disclosed in US 2005/0135983 is dat multiple reactors are needed in the sub-dew-point Claus process unit.

It is an object of the present invention to provide an optimised process for purification of a synthesis gas stream derived from a range of carbonaceous fuels, such that the purified synthesis gas is suitable for further use, especially for power production.

Figure 1:
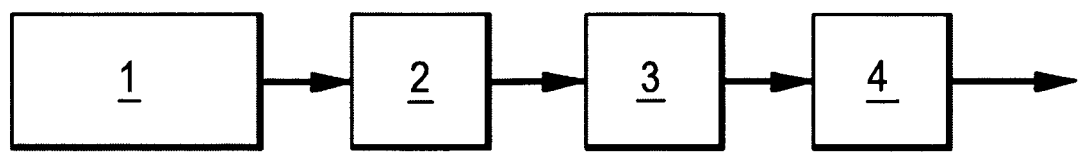
FIG. 1 illustrates a process for producing a purified synthesis gas stream.

It has now been found that by converting $H_2S$ in the feed synthesis gas stream directly to elemental sulphur, this object can be achieved.

Therefore, the invention provides a process for producing a purified synthesis gas stream from a feed synthesis gas stream comprising besides the main constituents carbon monoxide and hydrogen also hydrogen sulphide, HCN and/or COS, the process comprising the steps of: (a) removing HCN and/or COS by contacting the feed synthesis gas stream with a catalyst in a HCN/COS reactor in the presence of steam/water, to obtain a synthesis gas stream depleted in HCN and/or in COS; (b) converting hydrogen sulphide in the synthesis gas stream depleted in HCN and/or in COS to elemental sulphur, by contacting the synthesis gas stream with an aqueous reactant solution containing solubilized Fe(III) chelate of an organic acid, at a temperature below the melting point of sulphur, and at a sufficient solution to gas ratio and conditions effective to convert $H_2S$ to sulphur and inhibit sulphur deposition, to obtain a synthesis gas stream depleted in hydrogen sulphide; (c) removing carbon dioxide from the synthesis gas stream depleted in hydrogen sulphide, to obtain the purified synthesis gas stream and a gas stream enriched in $CO_2$.

The process enables removal of hydrogen sulphide, carbonyl sulphide and/or hydrogen cyanide to low levels. The purified synthesis gas, because of its low level of contaminants, is suitable for use as fuel, suitably in gas turbines, or for use in catalytical chemical conversions. The purified synthesis gas is especially suitable for use in an Integrated Gasification Combined Cycle (IGCC).

In step (c), a carbon dioxide stream at elevated pressure, suitably in the range of from 4 to 12 bara is obtained. This carbon dioxide stream can be further pressurised and used for example for enhanced oil recovery.

The process is economical because $H_2S$ in the synthesis gas stream is converted directly into elemental sulphur. The synthesis gas stream depleted in $H_2S$ has very low concentrations of $H_2S$, enabling the use of an inexpensive non-selective acid gas removal unit to remove remaining $H_2S$ as well as $CO_2$.

It will be understood that the amount and type of contaminants in the feed synthesis gas stream can vary and depends on the amount of these contaminants present in the feedstock used to generate the feed synthesis gas stream.

Generally, the feed synthesis gas stream is obtained by gasification of feedstock.

When using solid fossil fuels such as biomass or coal as feedstock, generally the amount of $H_2S$ and COS in the synthesis gas stream leaving the gasifier is below 15 volume %, typically below 5 volume % based on the synthesis gas stream.

When using an oil residue as feedstock, generally the amount of $H_2S$ and COS in the synthesis gas stream leaving the gasifier will be below 20 volume %, typically below 10 volume % based on the synthesis gas stream.

The synthesis gas stream generated from a feedstock may comprise particulate matter, for example fly-ash or soot particles. Therefore, in a preferred embodiment synthesis gas exiting a synthesis gas generation unit is contacted with scrubbing liquid in a soot scrubber to remove particulate matter, in particular soot, thereby obtaining the feed synthesis gas stream. The synthesis gas stream exiting the synthesis gas generating unit is generally at elevated temperature and/or elevated pressure. Especially in the event that the synthesis gas is generated in a gasifier, the synthesis gas stream exiting the gasifier will be at elevated temperature and at elevated pressure. To avoid additional cooling and/or depressurising steps, the scrubbing step in the soot scrubber is preferably performed at elevated temperature and/or at elevated pressure. Preferably, the temperature at which the synthesis gas is contacted with scrubbing liquid is in the range of from 40 to 160° C., more preferably from 110 to 150° C. Preferably, the pressure at which the synthesis gas stream is contacted with scrubbing liquid is in the range of from 20 to 80 bara, more preferably from 20 to 60 bara.

The amount of HCN and/or COS in the feed synthesis gas stream depends on the composition of the feedstock from which the synthesis gas is derived and the technology applied for the production of synthesis gas. Generally, the amount of COS in a feed synthesis gas stream derived from solid fossil fuel feedstocks, especially coal, is from about 100 to 3000 ppmv, based on the feed synthesis gas stream. For biomass, the amount of COS is generally in the range of from 1 to 100 ppmv.

In step (a), HCN and/or COS is removed from the feed synthesis gas stream via catalytic conversion.

Catalysts for the hydrolysis of HCN and/or COS are known to those skilled in the art and include for example $TiO_2$-based catalysts or catalysts based on alumina and/or chromium-oxide. Preferred catalysts are $TiO_2$-based catalysts.

The amount of water/steam is preferably between 5 v/v % and 80 v/v %, more preferably between 10 v/v % and 70 v/v %, still more preferably between 15 v/v % and 50 v/v %, based on steam.

In a preferred embodiment of step (a), the feed synthesis gas stream is contacted with a water gas shift catalyst in a shift reactor to remove HCN and/or COS and to additionally react at least part of the carbon monoxide with water to form carbon dioxide and hydrogen.

In an especially preferred embodiment of step (a), carbon monoxide in the feed synthesis gas stream is converted with a low amount of steam in the presence of a catalyst as present in one or more fixed bed reactors. A series of shift reactors may be used wherein in each reactor a water gas shift conversion step is performed. The content of carbon monoxide, on a dry basis, in the feed synthesis gas stream as supplied to the first or only water gas shift reactor is preferably at least 50 vol. %, more preferably between 55 and 70 vol. %. The feed synthesis gas stream preferably contains hydrogen sulphide in order to keep the catalyst sulphided and active. The minimum content of hydrogen sulphide will depend on the operating temperature of the shift reactor, on the space velocity (GHSV) and on the sulphur species present in the feed synthesis gas stream. Preferably at least 300 ppm $H_2S$ is present in the feed synthesis gas stream. There is no limitation on the maximum amount of $H_2S$ from a catalyst activity point of view.

In the preferred embodiment of step (a), the steam to carbon monoxide molar ratio in the feed synthesis gas stream as it enters the first or only water gas shift reactor is preferably between 0.2:1 and 0.9:1. The temperature of the feed synthesis gas stream as it enters the shift reactor is preferably between 190 and 230° C. In addition it is preferred that the inlet temperature is between 10 and 60° C. above the dew-point of the feed to each water gas shift conversion step. The space velocity in the reactor is preferably between 6000-9000 $h^{-1}$. The pressure is preferably between 2 and 5 MPa and more preferably between 3 and 4.5 MPa.

The conversion of carbon monoxide may generally not be 100% because of the sub-stoichiometric amount of steam present in the feed of the reactor. In a preferred embodiment the content of carbon monoxide in the shift reactor effluent, using a fixed bed reactor, will be between 35 and 50 vol. % on a dry basis, when starting from a feed synthesis gas stream comprising between 55 and 70 vol. % carbon monoxide, on a dry basis, and a steam/CO ratio of 0.2 to 0.3 molar. If a further conversion of carbon monoxide is desired it is preferred to subject the shift reactor effluent to a next water gas shift conversion step.

The preferred steam/water to carbon monoxide molar ratio, inlet temperature and space velocity for such subsequent water gas shift conversion steps is as described for the first water gas shift conversion step. As described above the feed synthesis gas stream is suitably obtained from a gasification process and is suitably subjected to a water scrubbing step. In such a step water will evaporate and end up in the syngas mixture. The resultant steam to CO molar ratio in such a scrubbed syngas will suitably be within the preferred ranges as described above. This will result in that no steam or water needs to be added to the syngas as it is fed to the first water gas shift conversion step. In order to achieve the desired steam to CO molar ranges for the subsequent steps steam or boiler feed water will have to be added to the effluent of each previous step.

The water gas shift step may be repeated to stepwise lower the carbon monoxide content in the shift reactor effluent of each next shift reactor to a CO content, on a dry basis, of below 5 vol. %. It has been found that in 4 to 5 steps, or said otherwise, in 4 to 5 reactors such a CO conversion can be achieved.

It has been found that it is important to control the temperature rise in each shift reactor. It is preferred to operate each shift reactor such that the maximum temperature in the catalyst bed in a single reactor does not exceed 440° C. and more preferably does not exceed 400° C. At higher temperatures the exothermal methanation reaction can take place, resulting in an uncontrolled temperature rise.

The catalyst used in the shift reactor is preferably a water gas shift catalyst, which is active at the preferred low steam to CO molar ratio and active at the relatively low inlet temperature without favouring side reactions such as methanation. Suitably the catalyst comprises a carrier and the oxides or sulphides of molybdenum (Mo), more preferably a mixture of the oxides or sulphides of molybdenum (Mo) and cobalt (Co) and even more preferably also comprising copper (Cu) tungsten (W) and/or nickel (Ni). The catalyst suitably also comprises one or more promoters/inhibitors such as potassium (K), lanthanum (La), manganese (Mn), cerium (Ce) and/or zirconium (Zr). The carrier may be a refractory material such as for example alumina, $MgAl_2O_4$ or $MgO$—$Al_2O_3$—$TiO_2$.

An example of a suitable catalyst comprises an active γ-Al2O3 carrier and between 1-8 wt % CoO and between 6-10 wt % MoO3. The catalyst is preferably present as an extrudate.

In a preferred embodiment of step (a), the feed synthesis gas stream comprises at least 50 vol. % of carbon monoxide, and the steam to carbon monoxide molar ratio in the feed synthesis gas stream as it enters the shift reactor or reactors is preferably between 0.2:1 and 0.9:1 and the temperature of the feed synthesis gas stream as it enters the shift reactor or reactors is between 190 and 230° C.

In the event that step (a) involves the shift reaction as described hereinabove, preferably, a portion of the "shifted" synthesis gas stream, optionally after removal of contaminants, is used for hydrogen manufacture, such as in a Pressure Swing Adsorption (PSA) step. The proportion of the shifted synthesis gas stream used for hydrogen manufacture will generally be less than 15% by volume, preferably approximately 1-10% by volume. The hydrogen manufactured in this way can then be used as the hydrogen source in hydrocracking of the products of the hydrocarbon synthesis reaction. This arrangement reduces or even eliminates the need for a separate source of hydrogen, e.g. from an external supply, which is otherwise commonly used where available. Thus, the carbonaceous fuel feedstock is able to provide a further reactant required in the overall process of biomass or coal to liquid products conversion, increasing the self-sufficiency of the overall process.

In step (a), a synthesis gas stream depleted in hydrogen cyanide and/or in COS is obtained.

In step (b), at least part of the hydrogen sulphide in the synthesis gas stream depleted in hydrogen cyanide and/or in COS is converted to elemental sulphur.

In step (b), hydrogen sulphide is converted to elemental sulphur by contacting the synthesis gas stream depleted in hydrogen cyanide and/or in COS with an aqueous reactant solution containing solubilized Fe(III) chelate of an organic acid, at a temperature below the melting point of sulphur, and at a sufficient solution to gas ratio and conditions effective to convert $H_2S$ to sulphur and inhibit sulphur deposition, thereby producing aqueous reactant solution containing dispersed sulphur particles and a synthesis gas stream depleted in hydrogen sulphide. The advantage of the process is that it is a very selective process, that does not require any tail gas treatment. It furthermore requires only one reactor.

The iron chelates employed are coordination complexes in which irons forms chelates with an acid. The acid may have the formula

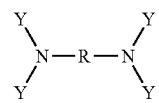

wherein
from two to four of the groups Y are selected from acetic and propionic acid groups;
from zero to two of the groups Y are selected from 2-hydroxy-ethyl, 2-hydroxypropyl, and

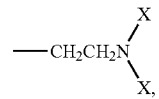

wherein X is selected from acetic and propionic acid groups; and
R is ethylene, propylene or isopropylene or alternatively cyclo-hexane or benzene where the two hydrogen atoms replaced by nitrogen are in the 1,2 position, and mixtures thereof.

Exemplary chelating agents for the iron include aminoacetic acids derived from ethylenediamine, diethylenetriamine, 1,2-propylenediamine, and 1,3-propylenediamine, such as EDTA (ethylenediamine tetraacetic acid), HEEDTA (N-2-hydroxyethyl ethylenediamine triacetic acid), DETPA (diethylenetriamine pentaacetic acid); aminoacetic acid derivatives of cyclic, 1,2-diamines, such as 1,2-di-amino cyclohexane-N,N-tetraacetic acid, and 1,2-phenylene-diamine-N,N-tetraacetic acid, and the amides of polyamino acetic acids disclosed in Bersworth U.S. Pat. No. 3,580,950. Suitably, the ferric chelate of N-(2-hydroxyethyl)ethylenediamine triacetic acid (HEEDTA) is used.

A further suitable iron chelate is the coordination complex in which iron forms a chelate with nitrilotriacetic acid (NTA).

The iron chelates are supplied in solution as solubilized species, such as the ammonium or alkali metal salts (or mixtures thereof) of the iron chelates. As used herein, the term "solubilized" refers to the dissolved iron chelate or chelates, whether as a salt or salts of the aforementioned cation or cations, or in some other form, in which the iron chelate or chelates exist in solution. Where solubility of the chelate is difficult, and higher concentrations of chelates are desired, the ammonium salt may be utilized, as described in European patent application publication No. 215,505.

However, the invention may also be employed with more dilute solutions of the iron chelates, wherein the steps taken to prevent iron chelate precipitation are not critical.

Regeneration of the reactant is preferably accomplished by the utilization of oxygen, preferably as air. As used herein, the term "oxygen" is not limited to "pure" oxygen, but includes air, air enriched with oxygen, or other oxygen-containing gases. The oxygen will accomplish two functions, the oxidation of Fe(II) iron of the reactant to the Fe(III) state, and the stripping of any residual dissolved gas (if originally present) from the aqueous admixture. The oxygen (in whatever form supplied) is supplied in a stoichiometric equivalent or excess with respect to the amount of solubilized iron chelate to be oxidized to the Fe(III) state. Preferably, the oxygen is supplied in an amount of from about 20 percent to about 500 percent excess. Electrochemical regeneration may also be employed.

In another embodiment of step (b), hydrogen sulphide might furthermore react with sulphur dioxide in the presence of a catalyst to form elemental sulphur. This reaction is known in the art as the Claus reaction. Preferably, the synthesis gas stream depleted in hydrogen cyanide and/or in COS together with a gas stream comprising $SO_2$ are provided to a sulphur recovery system comprising one or more Claus catalytic stages in series. Each of the Claus catalytic stages comprises a Claus catalytic reactor coupled to a sulphur condenser. In the Claus catalytic reactor, the Claus reaction between $H_2S$ and $SO_2$ to form elemental sulphur takes place. A product gas effluent comprising elemental sulphur as well as unreacted $H_2S$ and/or $SO_2$ exits the Claus catalytic reactor and is cooled below the sulphur dew point in the sulphur condenser coupled to the Claus catalytic reactor to condense and separate most of the elemental sulphur from the Claus reactor effluent. The reaction between $H_2S$ and $SO_2$ to form elemental sulphur is exothermic, normally causing a temperature rise across the Claus catalytic reactor with an increasing concentration of $H_2S$ in the incoming feed gas stream. At an $H_2S$ concentration in the synthesis gas stream depleted in hydrogen cyanide and/or in COS above 30% or even above 15%, it is believed that the heat generated in the Claus catalytic reactors will be such that the temperature in the Claus reactors will exceed the desired operating range if sufficient $SO_2$ is present to react according to the Claus reaction. Preferably, the operating temperature of the Claus catalytic reactor is maintained in the range of from about 200 to about 500° C., more preferably from about 250 to 350° C.

In step (c) carbon dioxide is removed from the synthesis gas stream depleted in hydrogen sulphide.

In a first embodiment of step (c), carbon dioxide is removed by contacting the synthesis gas stream depleted in $H_2S$ with absorbing liquid to remove carbon dioxide and remaining hydrogen sulphide.

Suitable absorbing liquids may comprise chemical solvents or physical solvents or mixtures thereof.

A preferred absorbing liquid comprises a chemical solvent and/or a physical solvent, suitably as an aqueous solution.

Suitable chemical solvents are primary, secondary and/or tertiary amines, including sterically hindered amines.

A preferred chemical solvent comprises a secondary or tertiary amine, preferably an amine compound derived from ethanolamine, more especially DIPA, DEA, MMEA (monomethyl-ethanolamine), MDEA (methyldiethanolamine) TEA (triethanolamine), or DEMEA (diethyl-monoethanolamine), preferably DIPA or MDEA. It is believed that these chemical solvents react with acidic compounds such as $H_2S$.

In a second embodiment of step (c), carbon dioxide is removed using a membrane.

It is advantageous to use membranes with a high selectivity for carbon dioxide. The selectivity is defined as the ratio of the carbon dioxide permeability over the permeability of carbon monoxide and hydrogen as measured in single gas experiments. Preferably, the selectivity of the membrane is between 10 and 200, preferably between 20 and 150.

Suitably the membrane material is chosen from the group of polyethylene oxide based materials, preferably polyethylene oxide based material comprising block-copolymers, especially PEO 600/5000 T6T6T or a cross linked PEO, polyimide or polyaramide based materials, cellulose acetate based materials, zeolite based materials, preferably silica-alumina phosphate based materials, more preferably SAPO-34, micro-porous silica materials and carbon molecular sieves materials.

In a third embodiment of step (c), carbon dioxide is removed by cooling the gas stream to a temperature at which carbon dioxide will separate from the gas stream. Suitably, the gas stream is cooled to a temperature at which carbon dioxide becomes a liquid or a solid so it can be separated from the gas stream.

The purified synthesis gas obtained in step (c) has low levels of contaminants, suitably in the ppmv or even in the ppbv range.

Suitably, the gas stream enriched in $CO_2$ obtained in step (c) is at a pressure in the range of from 3 to 15 bara, preferably from 5 to 15 bara. This pressurised gas stream enriched in $CO_2$ can advantageously be used for enhanced oil recovery, with less compression equipment needed.

In applications where the $CO_2$-enriched gas stream needs to be at a high pressure, for example when it will be used for injection into a subterranean formation, it is an advantage that the $CO_2$-enriched gas stream is already at an elevated pressure.

In one embodiment, the $CO_2$-enriched gas stream is further pressurised and used for enhanced oil recovery, suitably by injecting it into an oil reservoir where it tends to dissolve into the oil in place, thereby reducing its viscosity and thus making it more mobile for movement towards the producing well.

In another embodiment, the $CO_2$-enriched gas stream is further pressurised and pumped into an aquifer reservoir for storage.

In yet another embodiment, the pressurised $CO_2$-enriched gas stream is further pressurised and pumped into an empty oil reservoir for storage.

For all the above options, a series of compressors is needed to pressurise the $CO_2$-enriched gas stream to the desired high pressures. Pressurising the $CO_2$-enriched gas stream from atmospheric pressure to a pressure of about 10 bara generally requires a large and expensive compressor. As the process results in a $CO_2$-enriched gas stream which is already at elevated pressure, preferably above 10 bara, the most extensive compressor is not needed.

In a preferred embodiment, the purified synthesis gas is used for power generation, especially in an IGCC system.

In the IGCC system, typically, fuel and an oxygen-containing gas are introduced into a combustion section of a gas turbine. In the combustion section of the gas turbine, the fuel is combusted to generate a hot combustion gas. The hot combustion gas is expanded in the gas turbine, usually via a sequence of expander blades arranged in rows, and used to generate power via a generator. Suitable fuels to be combusted in the gas turbine include natural gas and synthesis gas.

Hot exhaust gas exiting the gas turbine is introduced into to a heat recovery steam generator unit, where heat contained in the hot exhaust gas is used to produce a first amount of steam.

Suitably, the hot exhaust gas has a temperature in the range of from 350 to 700° C., more preferably from 400 to 650° C. The composition of the hot exhaust gas can vary, depending on the fuel gas combusted in the gas turbine and on the conditions in the gas turbine.

The heat recovery steam generator unit is any unit providing means for recovering heat from the hot exhaust gas and converting this heat to steam. For example, the heat recovery steam generator unit can comprise a plurality of tubes mounted stackwise. Water is pumped and circulated through the tubes and can be held under high pressure at high temperatures. The hot exhaust gas heats up the tubes and is used to produce steam.

The heat recovery steam generator unit can be designed to produce three types of steam: high pressure steam, intermediate pressure steam and low pressure steam.

Preferably, the steam generator is designed to produce at least a certain amount of high pressure steam, because high pressure steam can be used to generate power. Suitably, high-pressure steam has a pressure in the range of from 90 to 150 bara, preferably from 90 to 125 bara, more preferably from 100 to 115 bara. Suitably, low-pressure steam is also produced, the low-pressure steam preferably having a pressure in the range of from 2 to 10 bara, more preferably from to 8 bara, still more preferably from 4 to 6 bara.

In the heat recovery steam generator unit preferably high pressure steam is produced in a steam turbine, which high pressure steam is converted to power, for example via a generator coupled to the steam turbine.

The purified synthesis gas, because of its low level of contaminants, is also suitable for use in catalytic processes, preferably selected from the group of Fischer-Tropsch synthesis, methanol synthesis, di-methyl ether synthesis, acetic acid synthesis, ammonia synthesis, methanation to make substitute natural gas (SNG) and processes involving carbonylation or hydroformylation reactions.

Without wishing to be restricted to a particular embodiment, the invention will now be described in further detail with reference to the Figures. In FIG. 1, there is shown a process for producing a purified synthesis gas stream. This starts with the gasification of biomass or coal with oxygen in a gasification unit 1 to form a feed synthesis gas stream comprising hydrogen sulphide, HCN and/or COS. Preferably, removal of solids such as slag, soot and the like is done in a solids removal unit (not shown). The resulting feed synthesis gas stream is led to a shift unit 2, where it is contacted with a shift catalyst, converting CO to $CO_2$ and hydrolysing HCN and COS. The resulting synthesis gas stream depleted in HCN and COS emanating from unit 2 is led to sulphur recovery unit 3, where $H_2S$ is converted to elemental sulphur. The resulting synthesis gas stream depleted in $H_2S$ is led from sulphur recovery unit 3 to acid gas removal unit 4, where it is contacted with absorbing liquid to remove CO2 and remaining H2S. This results in a purified synthesis gas stream.

Figure 2:
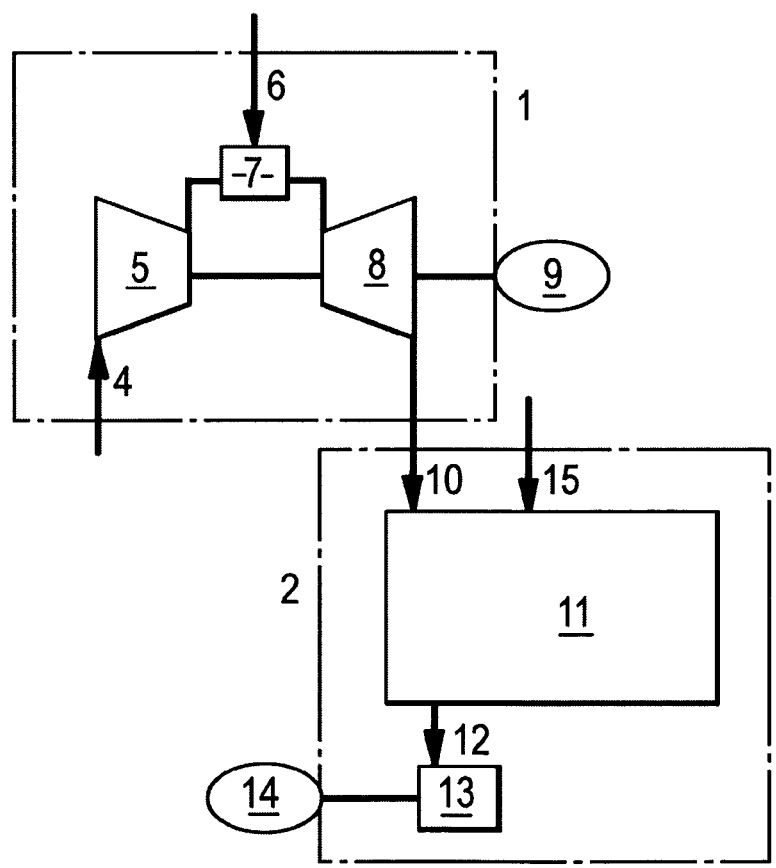
FIG. 2 illustrates a process for producing a purified synthesis gas stream.

In FIG. 2, a preferred embodiment is depicted, wherein the purified synthesis gas is used for power production. In FIG. 2, a purified synthesis gas stream as produced in a process according to FIG. 1 is led to a power plant comprising a gas turbine (1) and a heat recovery steam generator unit (2). In the gas turbine, an oxygen-containing gas is supplied via line 4 to compressor 5. Purified synthesis gas as produced in a process described in FIG. 1 is supplied via line 6 to combuster 7 and combusted in the presence of the compressed oxygen-containing gas. The resulting combustion gas is expanded in expander 8 and used to generate power in generator 9. Remaining exhaust gas comprising $CO_2$ and oxygen is led via line 10 to a heat recovery steam generator unit 2. In the heat recovery steam generator unit, water is heated against the hot exhaust gas in heating section 11 to generate steam. The steam is led via line 12 into a steam turbine 13 to produce additional power in generator 14.

What is claimed is:

1. A process for producing a purified synthesis gas stream from a feed synthesis gas stream, comprising, besides the main constituents of carbon monoxide and hydrogen also hydrogen sulphide, HCN and/or COS, the process comprising the steps of:
    (a) removing HCN and/or COS from the feed synthesis gas stream by contacting the feed synthesis gas stream with a catalyst in a HCN/COS reactor in the presence of steam/water, to obtain a synthesis gas stream depleted in HCN and/or in COS, wherein the steam/water to carbon monoxide molar ratio in the feed synthesis gas stream as it enters the HCN/COS reactor is in the range of from 0.2:1 and 0.9:1 and wherein the temperature of the feed synthesis gas stream as it enters the HCN/COS reactor is in the range of from 190 to 230° C. and wherein the feed synthesis gas stream comprises at least 50 volume % of carbon monoxide, on a dry basis;
    (b) converting hydrogen sulphide in the synthesis gas stream depleted in HCN and/or in COS to elemental sulphur, by contacting the synthesis gas stream depleted in HCN and/or in COS with an aqueous reactant solution containing solubilized Fe(III) chelate of an organic acid, at a temperature below the melting point of sulphur, and at a sufficient solution to gas ratio and conditions effective to convert H2S to sulphur and inhibit sulphur deposition, to obtain a synthesis gas stream depleted in hydrogen sulphide; and
    (c) removing carbon dioxide from the synthesis gas stream depleted in hydrogen sulphide, to obtain the purified synthesis gas stream and a gas stream enriched in CO2.

2. A process according to claim 1, wherein step (a) is performed using a water gas shift catalyst and the HCN/COS reactor is a shift reactor, to additionally react at least part of the carbon monoxide to carbon dioxide.

3. A process according to claim 1, wherein in step (c) carbon dioxide is removed by contacting the synthesis gas stream depleted in hydrogen sulphide with an absorbing liquid at low temperature and at elevated pressure, thereby transferring carbon dioxide from the synthesis gas stream depleted in hydrogen sulphide to the absorbing liquid to obtain absorbing liquid enriched in carbon dioxide and the purified gas stream.

4. A process according to claim 1, wherein in step (c) carbon dioxide is removed using a membrane.

5. A process according to claim 1, wherein in step (c) carbon dioxide is removed by cooling the synthesis gas stream depleted in hydrogen sulphide to a temperature at which carbon dioxide will separate from the synthesis gas stream depleted in hydrogen sulphide.

6. A process according to claim 1, wherein the purified synthesis gas stream is used in a combustion turbine to produce electricity.

7. A process according to claim 6, wherein hot exhaust gas is emitted from the combustion turbine and is introduced into a heat recovery steam generator unit to produce steam used to produce additional electricity.

8. A process according to claim 1, wherein the further purified synthesis gas is used in catalytic processes selected from the group consisting of Fischer-Tropsch synthesis, methanol synthesis, di-methyl ether synthesis, acetic acid synthesis, ammonia synthesis, methanation to make substitute natural gas (SNG) and processes involving carbonylation or hydroformylation reactions.

9. A process according to claim 1, wherein the gas stream enriched in $CO_2$ is at a pressure in the range of from 5 to 50 bara.

10. A process according to claim 9, wherein the gas stream enriched in $CO_2$ is further pressurised and injected into a subterranean formation for use in enhanced oil recovery or for storage into an aquifer reservoir or for storage into an empty oil reservoir.

* * * * *